United States Patent
Laine et al.

(10) Patent No.: US 12,457,531 B2
(45) Date of Patent: Oct. 28, 2025

(54) METHOD FOR WIRELESS ROAMING USING OUT-OF-BAND COMMUNICATIONS

(71) Applicant: GE Precision Healthcare LLC, Wauwatosa, WI (US)

(72) Inventors: Tuomas Valtteri Laine, Vantaa (FI); Matthew Richard Pekarske, Grafton, WI (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 784 days.

(21) Appl. No.: 17/651,041

(22) Filed: Feb. 14, 2022

(65) Prior Publication Data

US 2023/0262535 A1 Aug. 17, 2023

(51) Int. Cl.
*H04W 36/08* (2009.01)
*H04W 36/00* (2009.01)
*H04W 36/30* (2009.01)
*A61B 5/00* (2006.01)
*H04W 84/12* (2009.01)

(52) U.S. Cl.
CPC ... *H04W 36/0027* (2013.01); *H04W 36/0085* (2018.08); *H04W 36/08* (2013.01); *H04W 36/302* (2023.05); *A61B 5/0022* (2013.01); *H04W 84/12* (2013.01)

(58) Field of Classification Search
CPC ......... H04W 36/0027; H04W 36/0085; H04W 36/08; H04W 36/302; H04W 36/0072; H04W 36/0064; H04W 36/36; H04W 84/12; A61B 5/0022; G16H 40/20; G16H 40/67
See application file for complete search history.

(56) References Cited

U.S. PATENT DOCUMENTS

| | | |
|---|---|---|
| 6,201,962 B1 | 3/2001 | Sturniolo et al. |
| 7,274,945 B2 | 9/2007 | Backes et al. |

(Continued)

OTHER PUBLICATIONS

Pekarske, M. et al., "Methods and Systems for Scanning When Mobile," U.S. Appl. No. 17/646,258, filed Dec. 28, 2021, 30 pages.

(Continued)

*Primary Examiner* — Kevin T Bates
*Assistant Examiner* — Hector Reyes
(74) *Attorney, Agent, or Firm* — McCoy Russell LLP

(57) ABSTRACT

Methods and systems are provided for reducing a time spent by a wireless device scanning for candidate access points (AP) during roaming. In one embodiment, a method includes, during a roaming mode of a wireless patient monitoring device connected to a wireless network via a first AP of the network, receiving AP information at the wireless patient monitoring device transmitted from one or more neighboring wireless devices connected to the WLAN using out-of-band radio communication; and connecting the wireless patient monitoring device to a second AP of the WLAN different from the first AP, based on the received AP information. The AP information may include a list of APs to which the one or more neighboring wireless devices are connected, along with corresponding signal strengths. The patient monitoring device may use the list of APs to determine a scanning strategy for selecting an appropriate AP to connect to.

7 Claims, 4 Drawing Sheets

(56) References Cited

U.S. PATENT DOCUMENTS

| | | |
|---|---|---|
| 7,572,408 B2 | 8/2009 | Wu et al. |
| 7,668,140 B2 | 2/2010 | Van Bemmel |
| 8,666,313 B2 | 3/2014 | Preston et al. |
| 9,338,816 B2 | 5/2016 | Liu et al. |
| 9,426,724 B2 | 8/2016 | Parron et al. |
| 9,655,116 B2 | 5/2017 | Kim et al. |
| 10,194,359 B2 | 1/2019 | Olvera-Hernandez et al. |
| 10,225,771 B2 | 3/2019 | Lakhdhar et al. |
| 11,223,564 B2 | 1/2022 | Indiresan et al. |
| 2004/0039817 A1 | 2/2004 | Lee et al. |
| 2007/0076661 A1* | 4/2007 | Lin ................. H04W 36/00837 370/331 |
| 2012/0046025 A1* | 2/2012 | Das ...................... H04W 48/08 455/422.1 |
| 2012/0071160 A1* | 3/2012 | Das ...................... H04W 48/16 455/434 |
| 2012/0230304 A1* | 9/2012 | Barbu .................. H04W 48/18 370/338 |
| 2014/0148100 A1* | 5/2014 | Kim ...................... H04W 72/20 455/41.2 |
| 2015/0264614 A1* | 9/2015 | Stager ............... H04W 36/0085 370/332 |
| 2016/0234220 A1* | 8/2016 | Wolman .................. G06F 21/30 |
| 2017/0013493 A1* | 1/2017 | HomChaudhuri ............................ H04W 36/0085 |
| 2022/0345992 A1* | 10/2022 | Changlani ............. H04W 48/16 |
| 2023/0132095 A1* | 4/2023 | Mueller ................ H04W 84/12 370/329 |

OTHER PUBLICATIONS

Pekarske, M. et al., "Methods and Systems for Conditional Scanning," U.S. Appl. No. 17/648,269, filed Jan. 18, 2022, 35 pages.

\* cited by examiner

METHOD FOR WIRELESS ROAMING USING OUT-OF-BAND COMMUNICATIONS

TECHNICAL FIELD

Embodiments of the subject matter disclosed herein relate generally to wireless communications, and in particular to wireless patient monitoring systems and associated methods.

BACKGROUND

Wireless local area network (WLAN) roaming is typically implemented using background scanning channels to scan for alternative WLAN access points (APs) having a stronger connection than an AP to which a wireless device is connected. Background scanning is a disruptive procedure, requiring a connected client, such as a smart phone, to go off channel to search for alternative APs. Roaming includes scanning all possible channels frequently for changes in the environment. A high number of scanned channels and short scanning intervals contribute to delays in data delivery, increased power consumption through transmitting/receiving operations, and excessive traffic polluting radio channels.

SUMMARY

The current disclosure at least partially addresses one or more of the above identified issues by a method for a wireless local area network (WLAN), comprising, during a roaming mode of a first wireless device connected to the WLAN via a first access point (AP) of the WLAN, receiving AP information at the first wireless device transmitted from one or more neighboring wireless devices connected to the WLAN using out-of-band (OOB) radio communication; and connecting the first wireless device to a second AP of the WLAN, the second AP different from the first AP, based on the received AP information. The AP information may include a list of APs to which the one or more neighboring wireless devices are connected, along with corresponding signal strengths. The first wireless device may use the list of APs to determine a scanning strategy for selecting an appropriate second AP to connect to. For example, the scanning strategy may include scanning channels corresponding to APs from the list with a Received Signal Strength Indicator (RSSI) above a threshold RSSI, and/or scanning specific channels in an order based on the AP information.

In this way, an enhanced scanning procedure is provided that utilizes OOB communication between neighboring devices. Short range, low power radio signals, such as within a Medical Body Area Network (MBAN), can be used to broadcast information about a currently connected AP and radio frequency (RF) channel environment (e.g., signal quality) from a first client, and a second, receiving client can then use the information to scan channels associated with a prioritized list of APs, resulting in a higher probability for more proactive roaming decisions, decreased possibility of disconnection, and higher efficiency in power consumption and air time utilization. Utilizing out-of-band communication in this way may additionally increase roaming reliability and performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

DETAILED DESCRIPTION

Figure 1:
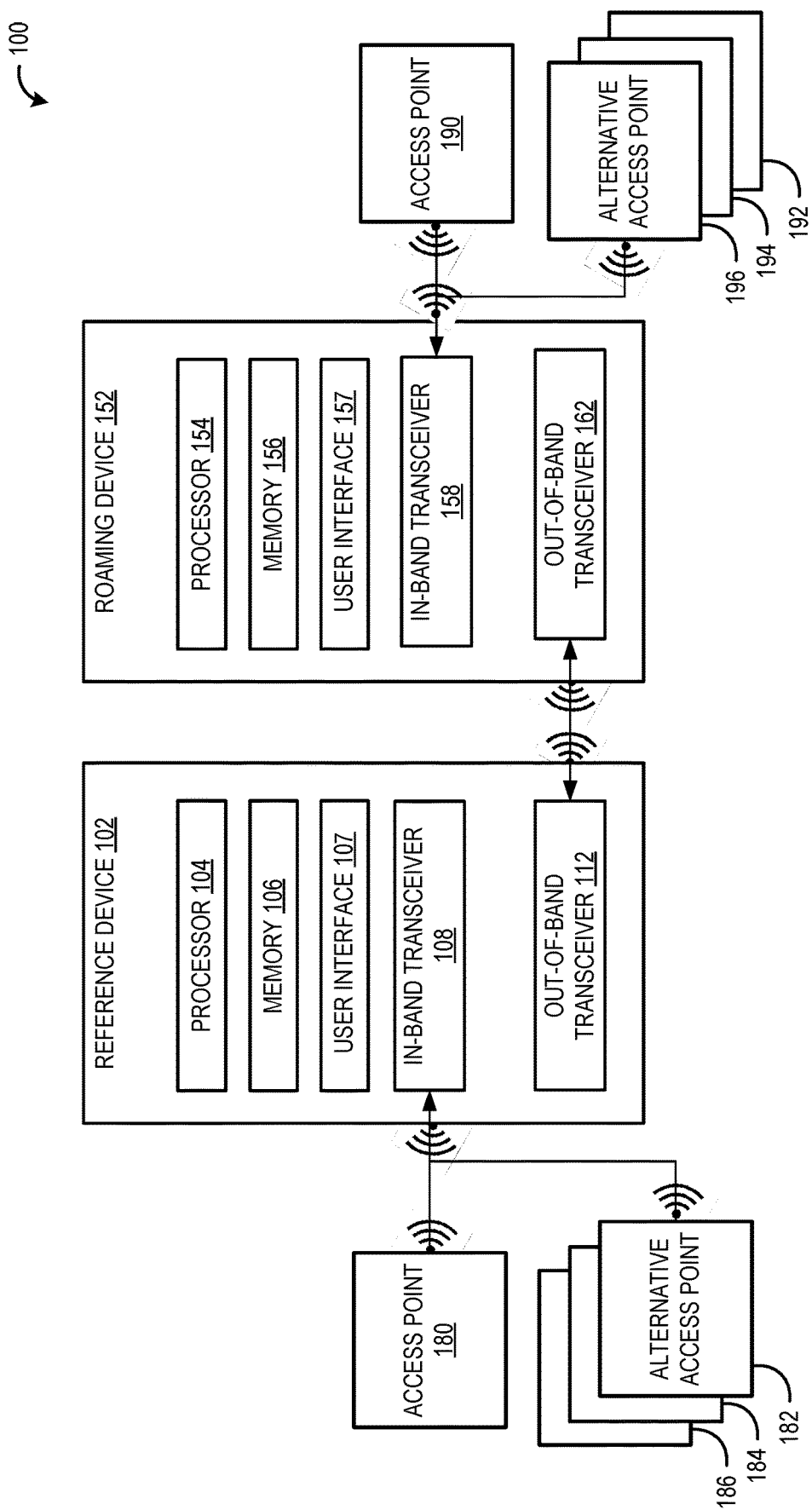
FIG. 1 is a schematic block diagram of a wireless system including a reference wireless device and a roaming device, in accordance with one or more embodiments of the present disclosure.

Wireless network systems may be used in retail, industry, medicine, manufacturing, and other enterprise environments to transmit and receive information among elements of a wireless network. For example, handheld devices or other wireless monitoring systems (e.g., a WLAN client) may be wirelessly connected to a network via a plurality of access points (AP) of the wireless network system. Information may be transmitted from the handheld device to the network via the APs such that information input or stored on the handheld device may be accessed by other devices connected to the network.

In a hospital or other medical setting, monitoring of a patient's physiological information may be done in part using wireless patient monitoring devices or other mobile medical devices. For example, a patient may be physically connected (e.g., via one or more sensors) to one or more hospital information systems including a wireless local area network (WLAN, also referred to herein as the wireless network or the network). As the patient and/or a caregiver of the patient move about the hospital, the caregiver may monitor the patient via a wireless patient monitoring device placed at the patient. Monitoring the patient may include receiving data from the wireless patient monitoring device (e.g., patient data, physiological data, alerts, messages, notifications, etc.) at a device of the caregiver. Monitoring the patient may also include uploading data to hospital information systems via the wireless network (e.g., inputting new patient data collected by the caregiver). The wireless patient monitoring device may be connected to the wireless network via at least one of a plurality of APs. The wireless network may further include a patient information database and/or other devices by which medical professionals may access and monitor patient data.

As a patient with a wireless patient monitoring device moves about a space, an available wireless signal strength may change, for example, as the wireless patient monitoring device moves closer to or further from a connected AP. The signal strength may affect a speed of information transmission, energy used for transmission, and a time between information transmission by the handheld device and information receipt by the network. To maintain or increase a wireless connection strength between the wireless patient monitor and the network, it may be desirable for the wireless patient monitor to roam to a different AP of the plurality of APs (e.g., switch from a connected AP to a different AP). Devices in a healthcare setting may roam when stationary, due to changing environment (e.g., Wi-Fi Infrastructure events such as channel or power level changes, and/or a room door opening or closing), or when the wireless patient monitor is mobile. Stationary and mobile roaming events may allow the wireless patient monitor to disconnect from a currently connected AP and connect to a candidate AP in the space which may have a stronger wireless signal, thus allowing for continued transmission of information from the network to the wireless patient monitor and/or from the wireless patient monitor to the network when the patient monitor is mobile or during environmental changes.

Roaming occurs when a WLAN client (e.g., the wireless patient monitor) determines that an AP that it is connected to is no longer of significant quality, and searches the network for another AP to connect to. In various embodiments, the WLAN client may roam primarily or solely based on a Received Signal Strength Indicator (RSSI). For example, the RSSI of the first AP connection may decrease when the WLAN client is moving throughout the network, such as when moving away from the first AP. Alternatively, the RSSI of the first AP connection may decrease when the WLAN client is stationary and some physical part of a wireless environment obstructs the first AP connection between the WLAN client and the first AP. For example, a door between the WLAN client and the first AP may be closed, or a piece of equipment may be moved to a position that creates interference with the first AP connection, or some other obstruction may be created between the first AP and the WLAN client.

Typically, a roaming process is initiated when a WLAN client determines that a change in a wireless environment has occurred. Accordingly, the WLAN client may monitor the environment and compare one or more values that have been recorded from the environment to respective threshold values. The roaming process may include four main phases: a trigger phase, a scanning phase, a selection phase, and a roaming phase. During the trigger phase, the WLAN client may measure properties of wireless signals of the wireless environment of the device and compare the measured properties to defined roaming trigger thresholds. The roaming process begins following one or more of a roaming trigger threshold being exceeded. If the roaming trigger threshold is exceeded, the WLAN client may enter into a roaming mode. If no roaming trigger thresholds are exceeded, the WLAN client may stay connected to its currently connected AP.

For example, if an RSSI of an AP that the WLAN client is connected to decreases below a threshold RSSI (e.g., −65 dBm), the WLAN client may enter into a roaming mode. Alternatively, if the RSSI of the AP to which the WLAN client is connected does not decrease below the threshold RSSI, the WLAN client may not enter into a roaming mode. In some embodiments, these threshold values may be hard-coded into a WLAN card and may not be adjustable.

During the scanning phase, the WLAN client may scan available channels (e.g., APs) to potentially roam to. During the scanning phase, the WLAN client may scan the wireless environment to identify available APs of the wireless network (e.g., to identify a plurality of candidate APs). Upon completion of a network scan, the WLAN client may enter the selection phase. During the selection phase, the WLAN client may determine which of the plurality of APs to connect to. For example, the WLAN client may select the candidate AP with a strongest RSSI. Once the WLAN client selects a candidate AP to roam to, the WLAN client may enter the roaming phase. During the roaming phase, the WLAN client may authenticate and associate with the candidate AP based on AP characteristics. All of the above phases may be completed prior to the WLAN client being able to send data to the network via the connected AP.

During the roaming phase, the WLAN client may send an authentication request to the candidate AP, and the candidate AP may send an authentication response back to the WLAN client. The WLAN client may then send an association request to the candidate AP, and the candidate AP may send an association response back to the WLAN client. In response to the association response from the candidate AP, the WLAN client may start transmitting data to the candidate AP. When the WLAN client is a wireless patient monitor, the transmitted data may include patient physiological information such as heart rate, blood pressure, and so on.

In the 802.11b/g (2.4 GHz) band, there are between 11 and 14 channels available for use depending on a domain that the WLAN client is operating in (e.g., FCC or ETSI). In the 802.11a (5 GHz) band, there are up to 23 channels available. If scans are done to completion on all 14 802.11b/g and 23 802.11a channels, with a scan delay of 150 ms per channel, scanning alone could amount to 5.5 seconds. With Wi-Fi 6E adding up to 59 additional channels, scanning times increases. Thus, in an environment such as a healthcare environment, where a patient with a patient monitoring device may frequently be moved to different locations within the healthcare environment, considerable time and resources may be wasted in scanning for new APs to connect to, during which the patient monitoring device may be offline.

To facilitate faster, smoother, and more reliable transfers of connections from a first AP to a second AP during roaming, systems and methods are provided herein for an enhanced roaming procedure that utilizes out-of-band information shared between neighboring wireless devices on a WLAN (also referred to herein as the network). The wireless devices may be tablet PCs, smart phones, or different types of wireless devices. In some embodiments, the wireless devices may be used to monitor patients in a hospital WLAN (i.e., patient monitors). The wireless devices may connect to the WLAN via a plurality of access points (AP), which may be arranged at different physical locations in a hospital or similar caregiving environment. As described in greater detail below, by sharing information about accessible APs and corresponding signal strengths between connected wireless devices on a network, a procedure for selecting an AP with a higher signal quality may be streamlined for a roaming device.

Figure 2:
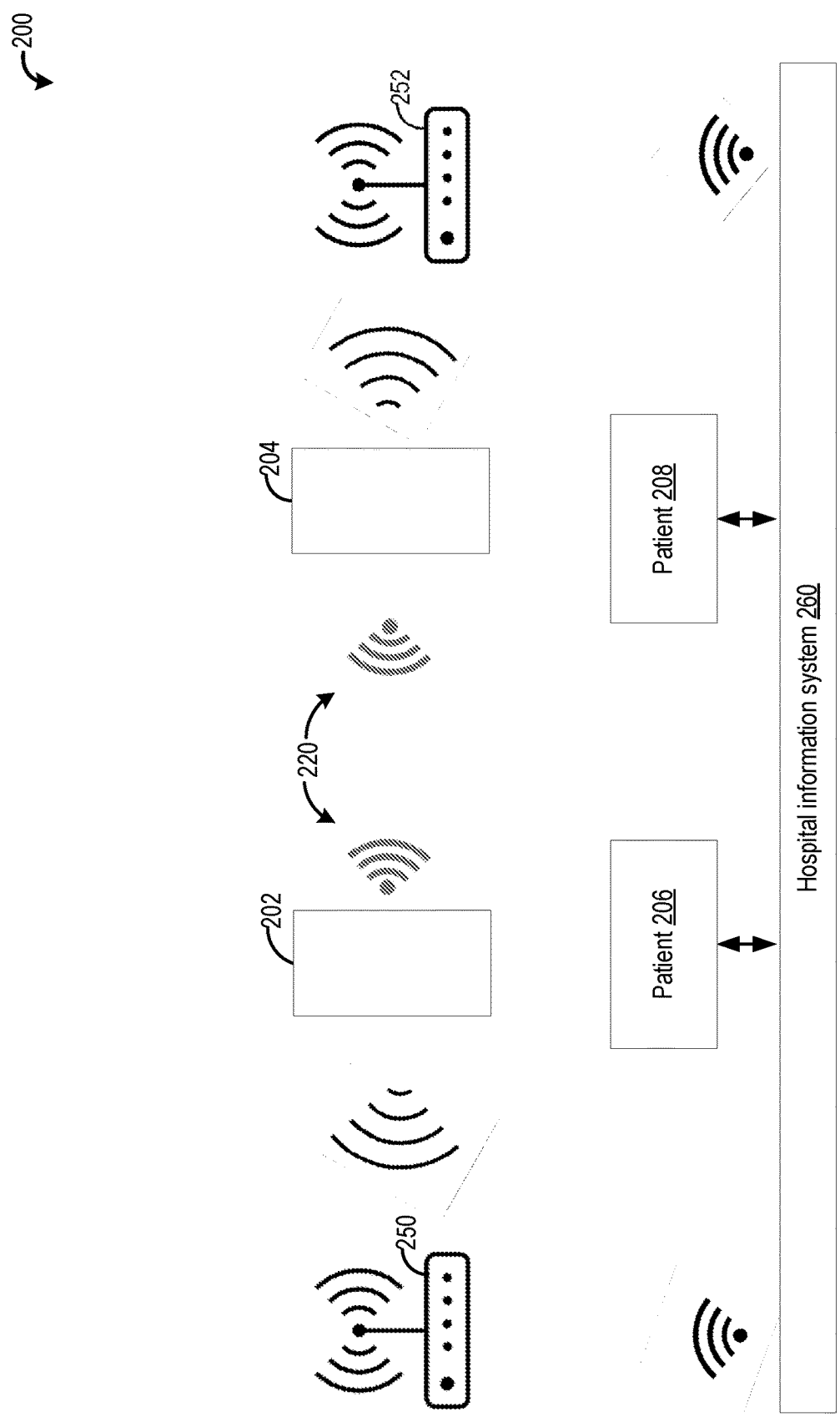
FIG. 2 shows a configuration of a wireless system for patient monitoring in a hospital environment, in accordance with one or more embodiments of the present disclosure.

FIG. 1 shows a wireless system, including a reference wireless device and a roaming wireless device connected to a WLAN, in accordance with one or more embodiments. The reference device and the roaming device may each include a radio communication module, which may be used for out-of-band (OOB) communications between the roaming device and the reference device. The reference device and the roaming device may be wireless patient monitoring devices connected to different access points of a hospital network, as shown in FIG. 2. During roaming, the roaming device may lose a first connection with a first AP (e.g., a signal strength of the first connection may decrease below a threshold signal strength). Upon losing the first connection to the first AP, the roaming device may scan for a neighboring reference device via the OOB communications, and subsequently request information from the neighboring reference device about available channels (e.g., APs) to connect to, by following one or more steps of a method described in FIG. 3. The roaming device may, from a first connection with a first AP, identify a second AP to connect to by following one or more steps of a first method described in FIG. 4.

Referring now to FIG. 1, an exemplary wireless system 100 is shown, including a reference device 102 and a roaming device 152 connected to a network, such as a WLAN, of wireless system 100. In various embodiments, wireless system 100 may be established within a hospital environment. Reference device 102 and roaming device 152 may be of a same type of device, or reference device 102 and roaming device 152 may be different types of devices. For example, reference device 102 may be a first patient monitoring device for monitoring a first type of patient, and roaming device 152 may be a second patient monitoring device for monitoring a second type of patient. In various embodiments, roaming device 152 may be a wireless patient monitoring device placed on or at a patient, and reference device 102 may be a wireless device of a caregiver such as a cell phone located in a proximity of the patient. Either of the caregiver and the patient may move around the hospital environment, such that the caregiver and the patient, and therefore the reference device 102 and the roaming device 152, may at times be in close proximity, and other times may not be in close proximity.

Reference device 102 may include a processor 104. Processor 104 may control the operation of reference device 102 in response to control signals from a user interface (UI) 107. In some embodiments, UI 107 is integrated into reference device 102, where a user may interact with, adjust, or select control elements in the UI 107 (e.g., buttons, knobs, touchscreen elements, etc.) to send one or more control signals to processor 104 from UI 107. In other embodiments, UI 107 is not integrated into reference device 102, and the user may interact with, adjust, or select control elements in UI 107 via a user input device, such as a mouse, track ball, touchpad, etc., or the operator may interact with UI 107 via a separate touchscreen, where the operator touches a display screen of UI 107 to interact with UI 107, or via another type of input device.

Processor 104 may execute instructions stored on a memory 106 to control reference device 102. As discussed herein, the memory 106 may include any non-transitory computer readable medium in which programming instructions are stored. For the purposes of this disclosure, the term "tangible computer readable medium" is expressly defined to include any type of computer readable storage. The example methods and systems may be implemented using coded instruction (e.g., computer readable instructions) stored on a non-transitory computer readable medium such as a flash memory, a read-only memory (ROM), a random-access memory (RAM), a cache, or any other storage media in which information is stored for any duration (e.g. for extended period time periods, permanently, brief instances, for temporarily buffering, and/or for caching of the information). Computer memory of computer readable storage mediums as referenced herein may include volatile and non-volatile or removable and non-removable media for a storage of electronic-formatted information such as computer readable program instructions or modules of computer readable program instructions, data, etc. that may be stand-alone or as part of a computing device. Examples of computer memory may include any other medium which can be used to store the desired electronic format of information and which can be accessed by the processor or processors or at least a portion of a computing device. In various embodiments, the memory 106 may include an SD memory card, an internal and/or external hard disk, USB memory device, or similar modular memory.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a wireless computer or entirely on the wireless computer or server. In the latter scenario, the wireless computer may be connected to the user's computer through any type of network, including a local area network (LAN) or a wide area network (WAN), or the connection may be made to an external computer (for example, through the Internet using an Internet Service Provider).

Reference device 102 may include an in-band transceiver 108. In various embodiments, in-band transceiver 108 may be or may include a WLAN wireless card. In some embodiments, the WLAN card may be an original equipment manufacturer (OEM) card, and may include a storage medium having computer executable code and a processor to execute that code, thus effectuating the operation of the WLAN card.

Reference device 102 may use in-band transceiver 108 to connect to the network via an AP 180. Additionally, a wireless environment of the network may include a plurality of alternative APs configured to connect to reference device 102, such as alternative APs 182, 184, and 186. Each of the APs 180, 182, 184, and 186 may have a transmitter and a receiver, or a transmitter/receiver (e.g., a single device with transmitting and receiving capabilities). In various embodiments, the AP 180 may be an AP that is in closest proximity to reference device 102 and/or an AP with a strongest signal in comparison to alternative APs 182, 184, and 186.

As an example, in the hospital environment, AP 180 and alternative APs 182, 184, and 186 may be arranged at different locations of the hospital environment, for example, in proximity to patients being monitored at different care units. The network may receive wirelessly transmitted information from AP 180 and alternative APs 182, 184, and 186, and relay the information to a hospital information system suitable for collecting and managing such information. For example, reference device 102 may be a wireless patient monitoring device that is communicating wirelessly with AP 180, and relaying physiological information collected by the wireless patient monitoring device through AP 180 to the hospital information system via the network. Reference device 102 may utilize in-band transceiver 108 and a transceiver of AP 180 to facilitate the wireless transmission of the physiological data.

Roaming device 152 is a similar device to reference device 102, and as such, includes components of reference device 102 described above, such as a processor 154, a memory 156, user interface 157, an in-band transceiver 158. Similar to reference device 102, roaming device 152 may use in-band transceiver 158 to connect to the network via an AP 190. Additionally, a plurality of alternative APs of the wireless environment may be configured to connect to roaming device 152, such as alternative APs 192, 194, and 196. In various embodiments, the AP 190 may be an AP that is in closest proximity to roaming device 152 and/or an AP with a strongest signal in comparison to alternative APs 192, 194, and 196.

In various embodiments, AP 180 and AP 190 may be different APs that are placed at different locations within the wireless environment. For example, AP 180 may be placed in a first unit of a hospital, to allow caregivers of the first unit access to the network, and AP 190 may be placed in a second unit of the hospital, to allow caregivers of the second unit access to the network. The first unit may be next to or in close proximity to the second unit. If the first unit is next to the second unit, and reference device 102 is in the first unit, reference device 102 may be able to connect to both AP 180 and AP 190. However, an RSSI of AP 180 may be stronger than an RSSI of AP 190, whereby reference device 102 may establish a connection with AP 180, with AP 190 thus being one of the alternative APs 182, 184, and 186.

Alternatively, the first unit may not be next to or in close proximity to the second unit. If the first unit is not next to the second unit, and reference device 102 is in the first unit, reference device 102 may be able to connect to AP 180 and may not be able to connect with AP 190 (e.g., where AP 190 is not one of the alternative APs 182, 184, and 186). Similarly, if roaming device 152 is in the second unit, roaming device 152 may be able to connect to AP 190, and may not be able to connect to AP 180 (e.g., where AP 180 is not one of the alternative APs 192, 194, and 196).

Reference device 102 may include an out-of-band (OOB) transceiver 112, and roaming device 152 may include an OOB transceiver 162. Via OOB transceiver 112, reference device 102 may communicate with OOB transceiver 162 of roaming device 152 via OOB radio communication over an OOB communication channel. The OOB radio communication may be short-range, low-power radio communication on an allocated portion of radio frequency spectrum outside the standard Wi-Fi spectrum. For the purposes of this disclosure, the short-range, low-power radio communication may refer to communication via a low-power transmitter (e.g., 1-25 mW of effective radiated power (ERP)) with a range of a five to twenty meters. The short-range, low-power communication may rely on technologies including Bluetooth®, near-field communication (NFC), ultra-wideband (UWB), and IEEE 802.15.4. In various embodiments, the OOB channel may be within the 2360-2500 MHz band used for MBAN communication. The OOB radio communication over the OOB channel may be connectionless and unidirectional. For the purposes of this disclosure, connectionless communication refers to the relaying of data between a first wireless device and a second wireless device, where a connection is not established between the first wireless device and the second wireless device, and the data may be received at other wireless devices listening on the OOB channel.

Via OOB transceiver 112, a continuous radio signal (e.g., a beacon) may be broadcasted by reference device 102 that may be received at roaming device 152, or a beacon may be broadcasted by roaming device 152 that may be received at reference device 102. Similarly, via OOB transceiver 162, a beacon may be broadcasted by roaming device 152 that may be received at reference device 102, or a beacon may be broadcasted from reference device 102 that may be received at roaming device 152. The beacon may be used to detect a presence of wireless devices within a proximity of the transmitting device based on metric such as signal strength of the beacon. For example, a signal strength of −65 dBm may indicate that the reference device 102 is reasonably close to the roaming device 152. Additional information may also be transmitted via OOB transceiver 112, such as a device ID, authentication information, and/or information about a wireless environment of reference device 102. The additional information may be included in the beacon to provide connectionless communication between the reference device 102 and the roaming device 152. For example, OOB transceiver 112 may be used to transmit information to roaming device 152 about an AP that reference device 102 is connected to. As described in greater detail below, the AP information may be used by roaming device 152 to select a suitable AP for roaming device 152 to connect to.

For example, a signal strength between roaming device 152 and AP 190 may decrease below a threshold signal strength (e.g., as roaming device 152 moves away from AP 190), and roaming device 152 may begin roaming. Roaming device 152 may seek to communicate with reference device 102, to request information about AP 180, to which reference device 102 is connected. Roaming device 152 may enable a discovery mode of roaming device 152, whereby roaming device 152 may send out a beacon advertising its presence to wireless devices (e.g., APs and the reference device) in the wireless environment. If roaming device 152 enters within the threshold distance of reference device 102, reference device 102 may receive the beacon via OOB transceiver 112. Reference device 102 may transmit information about AP 180 to roaming device 152 via OOB transceiver 112. Roaming device 152 may receive the information about AP 180 via OOB transceiver 162. The information about AP 180 may include a signal strength of AP 180 (e.g., an RSSI) received at in-band transceiver 108 of reference device 102. In response to the information, roaming device 152 may scan for AP 180 on wireless system 100 via in-band transceiver 158. Scanning for AP 180 may include scanning channels of the wireless system 100 for a channel on which AP 180 is communicating. The scan may return an RSSI of AP 180 as received at in-band transceiver 158 (e.g., which may be different from the RSSI received at in-band transceiver 108 of reference device 102). If the RSSI of AP 180 exceeds a threshold RSSI, roaming device 152 may connect to AP 180. In this way, the OOB communication channel established between OOB transceiver 112 and OOB transceiver 162 may be used to communicate AP information that may aid roaming device 152 in selecting an appropriate AP to connect to during roaming.

FIG. 2 shows an exemplary configuration of a hospital wireless system 200 for monitoring patients in a healthcare facility. Hospital wireless system 200 may include a first patient monitoring device 202 and a second patient monitoring device 204. First patient monitoring device 202, second patient monitoring device 204, and hospital wireless system 200 may be non-limiting embodiments of reference device 102, roaming device 152, and wireless system 100, respectively. First patient monitoring device 202 and second patient monitoring device 204 may be used to wirelessly transmit patient physiological data of one or more patients to wireless devices and/or information systems within the hospital environment.

First patient monitoring device 202 may be used by a first caregiver to monitor a first patient 206, and second patient monitoring device 204 may be used by a second caregiver to monitor a second patient 208. First patient monitoring device 202 and second patient monitoring device 204 may be wirelessly connected to a hospital information system 260 via a wireless network of hospital wireless system 200. The hospital information system 260 may include patient monitoring data. The patient monitoring data may include, for example, vital signs, blood pressure, and/or other physiological data. The patient monitoring data may be collected, for example, via one or more electronic sensors to which first patient 206 and/or second patient 208 are connected (e.g., in a bed of the healthcare facility).

First patient 206 may be receiving treatment at a first location within the hospital environment, and second patient 208 may be receiving treatment at a second location within the hospital environment, where the first location and the second location are different. As such, first patient monitoring device 202 may be wirelessly connected to the wireless network via a first AP 250, and second patient monitoring device 204 may be wirelessly connected to the wireless network via a second AP 252.

First patient monitoring device 202 and second patient monitoring device 204 may additionally communicate via an OOB radio communication 220. The OOB radio communication 220 may be established between a first OOB transceiver (e.g., OOB transceiver 112 of FIG. 1) of first patient monitoring device 202 and a second OOB transceiver (e.g., OOB transceiver 162 of FIG. 1) of second patient monitoring device 204.

First patient monitoring device 202 and second patient monitoring device 204 may be mobile, and as such, first patient monitoring device 202 and second patient monitoring device 204 may move through areas of the healthcare facility as patients 206 and 208 are moved. As they move, they may roam. During roaming, the first patient monitoring device 202 and/or second patient monitoring device 204 may switch from a first connection with a first AP to a second, stronger connection with a second AP.

For example, first patient monitoring device 202 may be used by a first caregiver to monitor a heart rate of patient 206, who may be receiving treatment in a first ward of a hospital. AP 250 may be located in the first ward. Second patient monitoring device 204 may be monitoring a blood pressure of patient 208, who may be receiving treatment in a second ward of the hospital. AP 252 may be located in the second ward. A blood pressure (e.g., from a blood pressure sensor) of patient 208 may be transmitted from second patient monitoring device 204 to hospital information system 260 via AP 252. A signal strength between AP 252 and second patient monitoring device 204 may be high (e.g., an RSSI of –50 dBm).

Patient 208 may then be moved from the second ward to the first ward. As a distance between patient 208 and AP 252 increases, a signal strength between AP 252 and second patient monitoring device 204 may decrease. As patient 208 enters the first ward, the signal strength between AP 252 and second patient monitoring device 204 may decrease below a roaming trigger threshold (e.g., an RSSI of –65 dBm). As a result of the signal strength decreasing below the roaming trigger threshold, second patient monitoring device 204 may enter a roaming mode, where second patient monitoring device 204 may seek a new AP with a stronger signal than AP 252.

To determine a suitable AP to connect to, second patient monitoring device 204 may perform a search for neighboring connected devices (e.g., neighboring wireless devices connected to the wireless network) via OOB radio communication 220. Second patient monitoring device 204 may receive a beacon via OOB radio communication 220 announcing a presence of first patient monitoring device 202, also located in the first ward, which patient 208 is entering. The beacon may advertise to second patient monitoring device 204 that AP information of first patient monitoring device 202 is available via an OOB communication channel at an advertised time slot. Second patient monitoring device 204 may receive the AP information of first patient monitoring device 202 over the OOB communication channel at the advertised time slot.

Upon receiving the requested AP information, second patient monitoring device 204 may determine that AP 250 may be a candidate AP for a new connection. For example, the requested AP information may indicate that first patient monitoring device 202 receives a signal from AP 250 at an RSSI of –55 dBm, which may suggest that AP 250 may be a suitable candidate for the new connection. As a result of receiving the AP information, second patient monitoring device 204 may perform a prioritized network scan for AP 250 rather than performing a full scan for APs in the wireless environment, which may include scanning on a plurality of channels of the wireless network to collect a plurality of candidate APs to connect to. The prioritized network scan may include scanning a prioritized list of channels of the network to collect one or more candidate APs of the prioritized list to connect to. The prioritized network scan may identify AP 250 as a suitable candidate, and may further indicate that second patient monitoring device 204 receives a signal from AP 250 at an RSSI of –65 dBm, which is sufficiently strong to establish a wireless connection. As a result of determining that the RSSI of AP 250 is sufficiently strong, second patient monitoring device 204 may send an authentication request to AP 250, and AP 250 may send an authentication response back to the wireless device. Second patient monitoring device 204 may then send an association request to AP 250, and AP 250 may send an association response back to second patient monitoring device 204. In response to the association response from AP 250, second patient monitoring device 204 may connect to AP 250.

In this way, the OOB radio communication 220 may be used to identify candidate APs for a roaming device to connect to, without having to perform a full scan of the wireless environment. While two patient monitoring devices are depicted in FIG. 2, in other examples, a roaming patient monitoring device may detect and request AP information from a plurality of neighboring connected devices. The AP information received at the roaming patient monitoring device may include a list of candidate APs, where AP information of each candidate AP (e.g., relevant channel, RSSI, SNR, etc.) is included on the list of candidate APs. As described in greater detail below, the list may be reordered at the roaming patient monitoring device to form a prioritized list of candidate APs, based on RSSI and other data as received at the roaming patient monitoring device. Channels of the APs on the prioritized list may then be scanned, to first determine whether a suitable AP is included on the prioritized list, prior to or instead of performing a full scan of available APs on the network. If a suitable AP is included on the prioritized list, the full scan may not be performed, reducing an amount of time used to establish a new connection, an amount of network traffic, and a time during which the roaming patient monitoring device may be offline.

Figure 3:
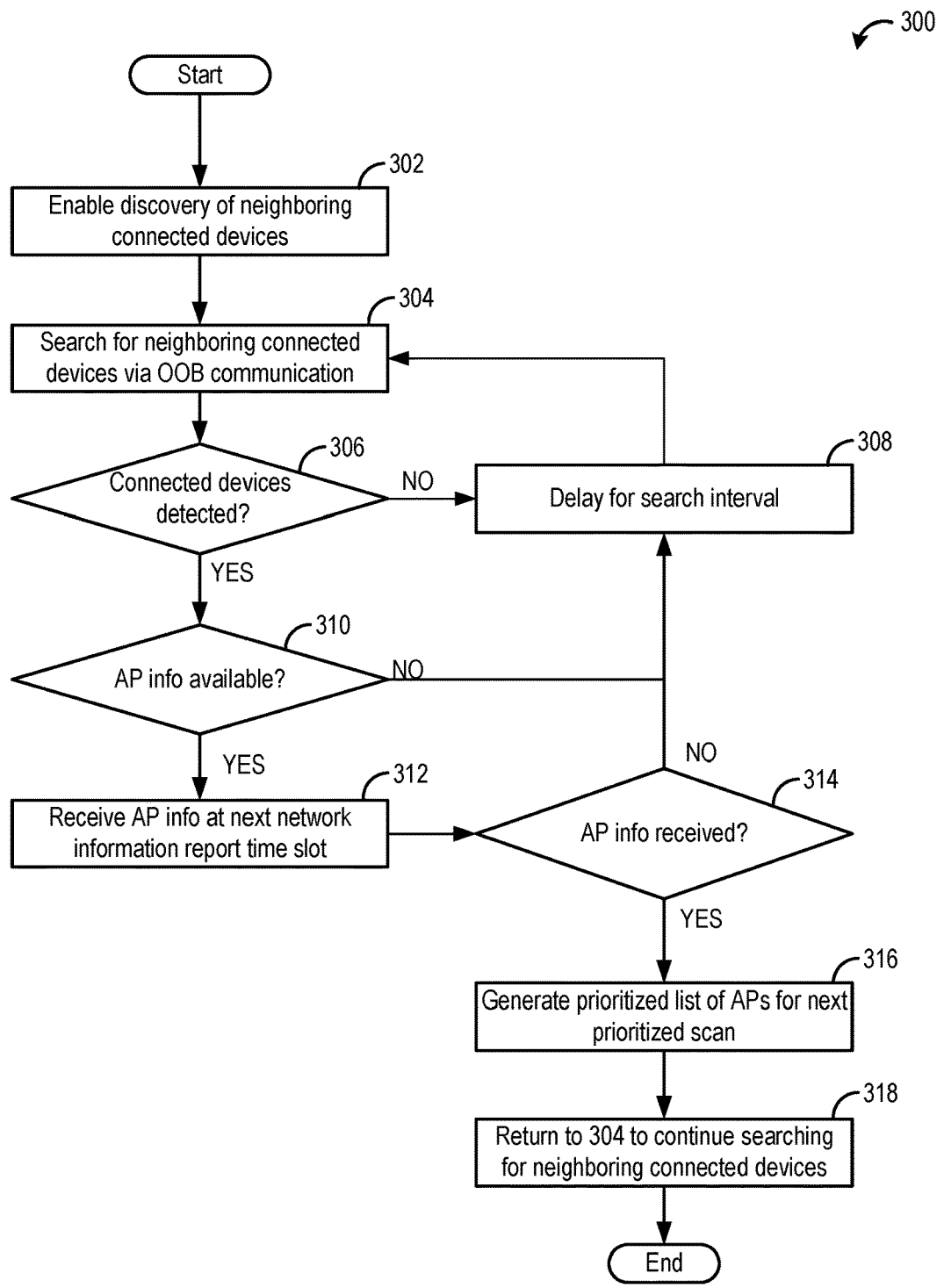
FIG. 3 is a flowchart illustrating an exemplary method for a roaming device for generating a prioritized list of channels to scan during a roaming procedure, in accordance with one or more embodiments of the present disclosure.

Referring now to FIG. 3, an exemplary method 300 is shown for a roaming device for generating a list of candidate APs to which the roaming device may connect when roaming within a wireless network. In various embodiments, the roaming device may be a wireless patient monitoring device used by a caregiver to monitor a status of a patient at healthcare facility via a hospital network. As such, the roaming device may be a non-limiting embodiment of second patient monitoring device 204 of FIG. 2. Method 300 and other methods described herein are described with reference to a wireless system, such as the wireless system 100 of FIG. 1 and/or the hospital wireless system 200 of FIG. 2. Method 300 and other methods described herein may be implemented via computer-readable instructions stored in a memory of the roaming device, and executed by a processor of the roaming device, such as memory 156 and processor 154 of roaming device 152 of FIG. 1.

Method 300 begins at 302, where method 300 includes enabling discovery of neighboring devices (e.g., reference device 102 of FIG. 1 and/or second patient monitoring device 204 of FIG. 2) connected to the wireless system. As described above, the neighboring devices may be similar to the roaming device, or the neighboring devices may be different. Discovery of neighboring devices may be enabled or disabled for various reasons. For example, discovery of neighboring devices may be disabled if the roaming device loses a Wi-Fi connection, or if a roam is pending or did not occur, or if no OOB communication channels are available at the roaming device. Decisions on disabling and enabling discover of neighboring devices may involve design tradeoffs based on battery life, a demand for network awareness, a processing burden of the roaming device, and/or other considerations.

At 304, method 300 includes searching for the neighboring devices on one or more OOB communication channels. Searching for the neighboring devices on the one or more OOB communication channels may include scanning for beacons transmitted over an OOB communication channel of the one or more OOB communication channels. The beacon may be transmitted from neighboring devices within a proximity of the roaming device via a low-power radio signal in a connectionless, unidirectional manner. The beacon may announce a presence of a neighboring device to the roaming device. In some embodiments, various neighboring devices may transmit beacons on the same OOB communication channel, while in other embodiments, different neighboring devices may transmit beacons on different OOB communication channels.

At 306, method 300 includes determining whether any neighboring connected devices have been detected. If at 306 it is determined that one or more neighboring connected devices have not been detected (e.g., no beacons are received from the one or more neighboring connected devices), method 300 may proceed to 308. At 308, method 300 may include delaying for a search interval. The search interval may be an interval during which searching for the neighboring connected devices is paused before reinitiating the search. For example, the search interval may be a few seconds or a few minutes. After delaying for the search interval, method 300 proceeds back to 304, where searching for neighboring connected devices via the OOB communication channel may be resumed.

If at 306 it is determined that one or more neighboring connected devices have been detected, for example, by receiving one or more beacons transmitted by the one or more neighboring connected devices, method 300 may proceed to 310. At 310, method 300 may include determining whether AP information is available from at least one of the neighboring connected devices. For example, a Wi-Fi connection between one or more of the neighboring connected devices and a connected AP of the wireless network may be lost, or a desired component of the AP information may not be included.

If at 310 it is determined that AP information is not available from the neighboring connected devices, method 300 may proceed back to 308, where method 300 may include delaying and subsequently resuming searching for neighboring connected devices. If at 310 is determined that AP information is available from at least one of the neighboring connected devices, method 300 may proceed to 312.

At 312, method 300 may include receiving the AP information on a specified OOB communication channel at a next network information report time slot. In various embodiments, the OOB communication channel and the allocated time slots may be specified in the beacons received by the neighboring connected devices. The time slots may be allocated for periodic reporting of the AP information, whereby the AP information may be transmitted from the neighboring connected devices to the roaming device at discrete time intervals, and may not be transmitted from the neighboring connected devices to the roaming device outside of the discrete time intervals. For example, a beacon transmitted on a first OOB communication channel may advertise a second OOB communication channel on which to receive the AP information and a specified temporal window during which the AP information will be transmitted. In some embodiments, the second OOB communication channel may be the same as the first OOB communication channel.

At 314, method 300 may include determining whether the AP information transmitted from the neighboring connected devices has been received at the roaming device. If at 314 it is determined that the AP information has not been received, method 300 may proceed back to 308, where method 300 may include delaying and subsequently resuming searching for neighboring connected devices. Alternatively, if at 314 it is determined that the AP information has been received, method 300 may proceed to 316.

At 316, method 300 may include generating a prioritized list of APs for a next prioritized scan. The prioritized list may include a compilation of AP information received from various neighboring connected devices. For example, the prioritized list may include a first set of AP information received from a first neighboring connected device, regarding a first AP that the first neighboring connected device is connected to; a second set of AP information received from a second neighboring connected device, regarding a second AP that the second neighboring connected device is connected to; a third set of AP information received from a third neighboring connected device, regarding a third AP that the third neighboring connected device is connected to; and so on. Each set of AP information may include, for example, an RSSI of a connected AP of the relevant neighboring connected device, an SNR of the connected AP, and/or other information that may be used by the roaming device to select a suitable AP to connect to. The prioritized list may be used to scan the wireless network to determine which of a plurality of candidate APs may be most suitable, as described below in reference to FIG. 4.

In some embodiments, an initial order of the APs for the next prioritized scan may depend on an order in which the APs were received from the neighboring connected devices. For example, a first AP on the prioritized list may be an AP to which a first responding neighboring connected device is connected; a second AP on the prioritized AP on the prioritized list may be an AP to which a second responding neighboring connected device is connected; and so on. In various embodiments, the prioritized list may be reordered based on a priority, as described below in reference to FIG. 4.

For example, a patient with a first patient monitoring device may move from a first location within a range of a connected AP to a second location that is outside the range of the connected AP. Upon exiting the range of the connected AP, the first patient monitoring device may initiate a roaming process. When roaming is initiated, the patient monitoring device may first search for neighboring connected devices at the second location (e.g., prior to attempting to scan for an AP). The second location may include ten other caregivers, where the ten other caregivers may also each have wireless devices connected to the wireless system. A first portion of the (neighboring) wireless devices may be connected to a first AP near the second location, a second portion of the wireless devices may be connected to a second AP near the second location, and a third portion of the wireless devices may be connected to a third AP near the second location. For example, the second location may be a ward of a hospital, where the first AP may be positioned at a first side of the ward, the second AP may be positioned at a second side of the ward, and the third AP may be positioned at a front desk of the ward.

Each of the ten neighboring wireless devices may transmit a beacon advertising an availability of AP information at a corresponding neighboring wireless device. Each of beacons transmitted may include an OOB communication channel on which the corresponding neighboring wireless device is transmitting the AP information of the corresponding neighboring wireless device, as well as a time slot for receiving the transmitted AP information.

Upon detecting the ten neighboring wireless devices from the beacons, the first patient monitoring device may create an ordered list of the ten neighboring wireless devices based on a strength of a low-power radio signal of the received OOB beacon from each of the ten neighboring wireless devices. The first portion of the neighboring wireless devices connected to the first AP of the second location may appear higher on the ordered list than the second and third portions of the neighboring wireless devices connected to the second and third APs near the second location (e.g., as a result of the first patient monitoring device being in closer proximity to the neighboring wireless devices connected to the first AP). As a result of the first portion of the neighboring wireless devices appearing higher on the ordered list than the second and third portion, AP information may be received first from the neighboring wireless devices connected to the first AP, and AP information from the neighboring wireless devices connected to the second and third APs may be received subsequently. In this way, the AP information received from the neighboring wireless devices may be received first in regard to an AP positioned closer to the first patient monitoring device, and secondly in regard to the AP positioned further from the first patient monitoring device. In some embodiments, the ordered list may be truncated to eliminate AP information corresponding to the AP's positioned further from the first patient monitoring device.

At 318, method 300 includes returning to step 304 to continue searching for neighboring connected devices. It should be appreciated that in various embodiments, method 300 may be performed iteratively or repeatedly while the first patient monitoring device is in operation. In other words, the first patient monitoring device may continuously search and monitor for neighboring connected devices in order to maintain contextual information about wireless connectivity of an environment of the first patient monitoring device as the patient moves through the hospital environment.

Figure 4:
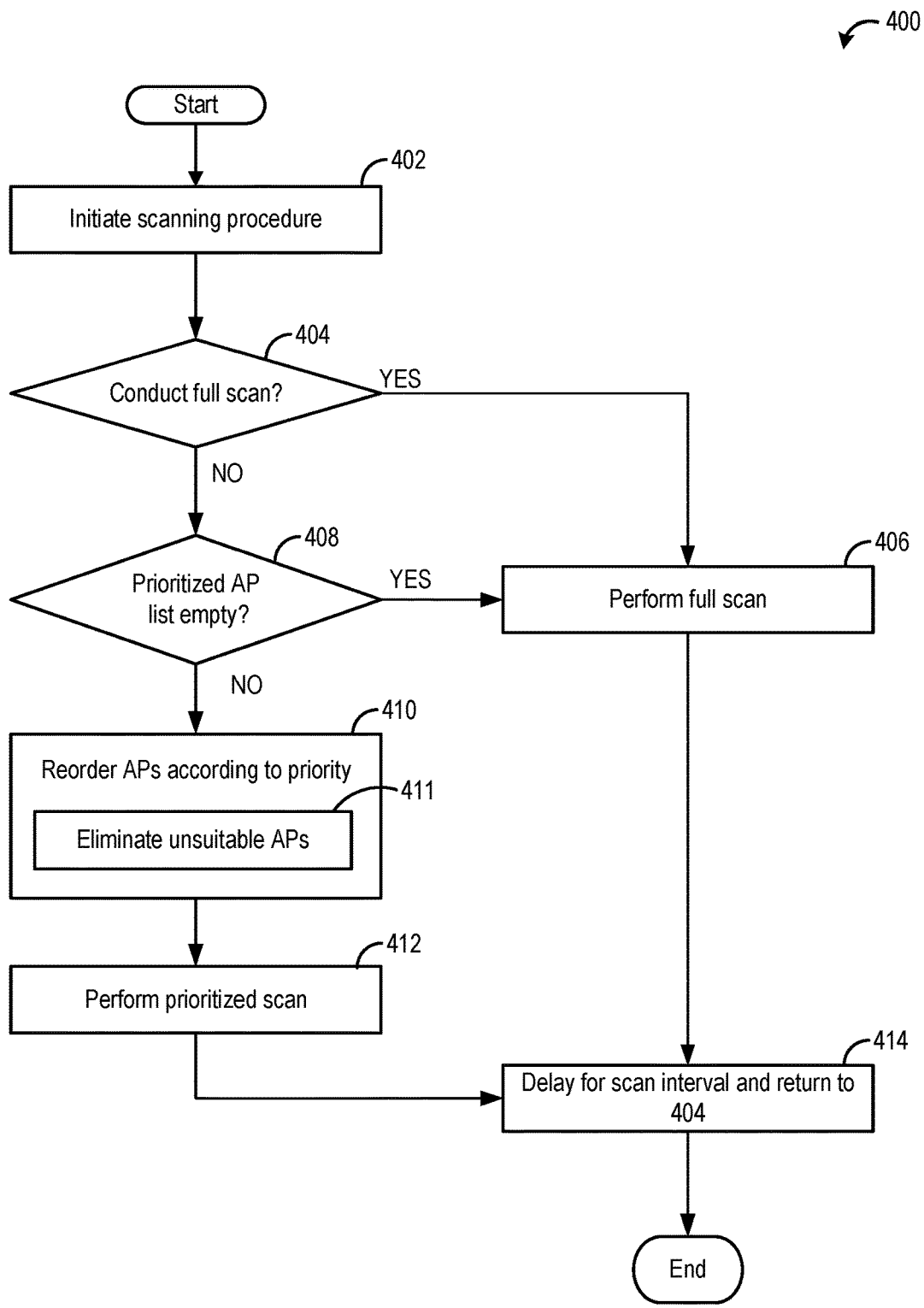
FIG. 4 is a flowchart illustrating an exemplary method for a roaming device for scanning during a roaming procedure, in accordance with one or more embodiments of the present disclosure.

Referring now to FIG. 4, an exemplary method 400 is shown for a roaming device for scanning available channels of a wireless network, such as the WLAN of wireless system 100 of FIG. 1, for a suitable AP that a roaming device may connect to. In various embodiments, the roaming device may be a wireless patient monitoring device used by a caregiver to monitor a status of a patient at healthcare facility via a hospital network. As such, the roaming device may be a non-limiting embodiment of second patient monitoring device 204 of FIG. 2. As described herein, scanning available channels of a wireless network for a suitable AP may include determining whether to implement a prioritized scan, based on AP information collected as described above in reference to method 300 of FIG. 3, or a full scan of the network, for example, in the absence of the AP information. Method 400 and other methods described herein may be implemented via computer-readable instructions stored in a memory of the roaming device, and executed by a processor of the roaming device, such as memory 156 and processor 154 of roaming device 152 of FIG. 1.

Method 400 begins at 402, where method 400 includes initiating a scanning procedure. Initiating the scanning procedure may include enabling or starting a scanning portion of software running on the roaming device. At 404, at 400 includes determining whether to conduct a full scan of the wireless network. For example, a full scan may be performed if upon initialization a full scan has not been completed yet, whereby there are no APs listed in a scan results list. In some embodiments, a full scan may be triggered by other circumstances, or a full scan may be performed periodically.

If at 404 it is determined that a full scan of the wireless network should be conducted, method 400 proceeds to 406. At 406, a full scan of the wireless network is performed. The full scan may include using active scanning or passive scanning to identify a candidate AP of all detectable APs of the wireless network. Active scanning includes the roaming device sending out probe requests on a plurality of channels that the roaming device is not currently connected to. The roaming device may listen for a first duration (e.g., 10 to 50 ms) for a probe response from one or more APs. Passive scanning includes the roaming device listening for beacons from APs in the wireless environment. Beacons may be broadcasted at a first frequency. For example, one beacon may be emitted by an AP every 100 ms. The roaming device may thus listen for beacons for 1.5 times the beacon rate (e.g., 150 ms) so as to not miss a present beacon.

Active channel scans may be completed faster than passive channel scans. In one example, devices operating in an 802.11a band may use dynamic frequency selection (DFS) to scan available channels. DFS may reduce interference with radar systems that operate on the same channels. Therefore, passive scans may be used on UNII-2 and UNII-Worldwide bands.

If at 404 it is determined not to conduct the full scan, method 400 proceeds to 408. At 408, method 400 includes determining whether a prioritized AP list is empty. The prioritized AP list may be a list of prioritized AP candidates, where the prioritized AP candidates are APs that have been selected as having an increased likelihood of being suitable for connecting to. For example, the prioritized AP candidates may have been referred by a neighboring connected device, as described above in reference to method 300 of FIG. 3. The list may be stored in the memory of the roaming device, or on a memory of a WLAN card of the roaming device.

If at 408 it is determined that the prioritized AP list is empty, method 400 proceeds to 406, and the full scan is performed. Alternatively, if at 408 it is determined that the prioritized AP list is not empty, method 400 proceeds to 410.

At 410, at 400 includes reordering APs of the prioritized AP list according to a priority rating. In some embodiments, the prioritized APs may be listed on the prioritized AP list in an order in which each prioritized AP was collected. For example, a first prioritized AP may be collected from a first neighboring connected device at a first time; a second prioritized AP may be collected from a second neighboring connected device at a second time after the first time; a third prioritized AP may be collected from a third neighboring connected device at a third time after the first and second times; where the first prioritized AP, the second prioritized AP, and the third prioritized AP may be different APs positioned at different locations in the wireless environment. The first prioritized AP may appear first on the prioritized AP list, the second prioritized AP may appear second on the prioritized AP list, and the third prioritized AP may appear third on the prioritized AP list.

In various embodiments, the order in which each prioritized AP is collected may depend on a proximity of the neighboring connected devices to the roaming device. For example, the first neighboring connected device may be closest to the roaming device; the second neighboring connected device may be further from the roaming device; and the third neighboring connected device may be the furthest from the roaming device. By collecting prioritized APs from the neighboring connected devices in an order based on a proximity of the neighboring connected devices, an ideal AP for the roaming device to connect to may appear higher on the list of prioritized APs.

However, the order in which each prioritized AP was collected may not correspond to a desirable order for scanning each prioritized AP to determine a suitable AP for the roaming device to connect to. For example, in some cases, the second prioritized AP collected from the second neighboring connected device at the second time may be more desirable to connect to than the first prioritized AP and the third prioritized AP. For example, the roaming device may receive a higher RSSI from the second prioritized AP than from the first and third prioritized APs, or the first neighboring connected device may be connected to the connected AP of the roaming device.

In response to the second prioritized AP being more desirable to connect to than the first prioritized AP and the third prioritized AP, the list of prioritized APs may be reordered such that the second prioritized AP appears first on the list, followed by the first prioritized AP and the third prioritized AP. By reordering the list of prioritized APs based on a priority of each prioritized AP on the list of prioritized APs, a time taken by the roaming device to connect to an ideal AP may be minimized. In other words, if the roaming device performs a scan of the APs based on the reordered list of prioritized APs, the ideal AP may be discovered and connected to fastest, as the ideal AP may be positioned at or close to the top of the list of prioritized APs.

Reordering of the prioritized AP list may be based on one or more parameters included in the AP information associated with each prioritized AP. In various embodiments, the list may be reordered in order of descending RSSI values, such that an AP of the prioritized APs with the highest RSSI value is at the top of a reordered list, and is thus the first AP considered for connection by the roaming device. For example, a first AP on the prioritized AP list may have an RSSI of −50 dBm; a second AP on the prioritized AP list may have an RSSI of −65 dBm, and a third AP on the prioritized AP list may have an RSSI of −75 dBm. In other embodiments, a different parameter may be used to establish priority of the APs on the prioritized AP list. For example, the parameters may include an RSSI, a signal-to-noise ratio (SNR), a number of data retries in a given time period, a number of expected beacons received or not received in a given time period, a current data rate, a time since a last scan, or a different parameter. Parameters may further include a difference between values of the aforementioned parameters for the AP in question compared to the connected AP.

At 411, reordering APs of the prioritized AP list according to a priority rating may include eliminating unsuitable APs from the prioritized AP list. An unsuitable AP may be an AP that the roaming device may not be able to connect to, or that may be undesirable for the roaming device to connect to. For example, an AP may be unsuitable if an RSSI of the AP is below a threshold RSSI (e.g., −65 dBm) by a threshold amount (e.g., 20 dB). If a candidate AP has an RSSI is greater than 20 dB below the RSSI threshold, the candidate AP may be eliminated from the prioritized AP list. An RSSI value greater than 20 dB below the RSSI threshold may provide an insufficient wireless connection between the roaming device and the network. Removal of unsuitable APs from the reordered list may reduce time and energy used to scan the reordered list. The 20 dB value may be configurable, for example, APs having RSSI values 15 dB, 25 dB, 30 dB, and so on below the RSSI threshold may be removed from the reordered list.

At 412, method 400 includes performing the prioritized scan, where prioritized channels of the reordered, prioritized APs on the prioritized AP list are scanned in the order of the prioritized AP list to select a candidate AP to connect to. As with the full scan, when a channel associated with an AP is scanned, the roaming device may compare parameters of the AP with parameters of the AP that the roaming device is currently connected to (e.g., the connected AP). When multiple APs are available in the wireless network which the roaming device may roam to, multiple parameters may be considered to determine which AP to roam to. Selection of the candidate AP may depend on one or more of the parameters described above for establishing AP priority. For example, a selected AP may have a greater RSSI and/or a higher SNR (e.g., greater signal than noise) compared to the connected AP.

At 414, method 400 includes delaying for a scan interval and returning to step 404, to determine whether a full scan may be performed. It should be appreciated that in various embodiments, method 400 may be performed iteratively or repeatedly while the roaming device is in operation. In other words, the roaming device may periodically perform full scans or prioritized scans to maintain contextual information about wireless connectivity of an environment of the first patient monitoring device as the patient moves through the hospital environment. Additionally, following performance of the prioritized scan, the roaming device may connect to the candidate AP.

Thus, in accordance with the methods and systems proposed herein, a time that a roaming device spends scanning for suitable APs of a wireless network may be reduced by using an OOB communication channel to receive information about candidate APs from neighboring connected devices. In other words, if the roaming device is moved to a location near a neighboring connected device, an AP that the neighboring connected device is connected to may be a suitable candidate for the roaming device to connect to. By receiving AP information from the neighboring connected devices, a prioritized list of candidate APs may be generated at the roaming device. The prioritized list may then be used to conduct a prioritized scan of the wireless network, where the prioritized scan scans for APs on the prioritized list and not for other APs of the wireless network not on the prioritized list. The prioritized list may additionally be reordered, such that an AP at or near the top of the prioritized list may be more desirable to connect to than other APs lower on the list, to further reduce the time the roaming device spends scanning for suitable APs. By reducing an amount of time spent scanning (e.g., by performing the prioritized scan rather than a full scan), an amount of network congestion may also be reduced, and an amount of time that the roaming device spends offline may be minimized. Additionally, an amount of power spent by the roaming device during scanning may be reduced, leading to longer use of the roaming device. Further, decisions regarding suitable APs to connect to while roaming may be made more proactively and seamlessly, lowering a possibility of disconnection.

The technical effect of using an OOB communication channel to receive AP information from neighboring connected devices prior to performing a network scan for suitable APs to connect to, is that a possibility of disconnection, an amount of scanning time spent by the roaming device, an amount of time that the roaming device is offline, and an amount of network traffic may be reduced.

The disclosure also provides support for a method for a wireless local area network (WLAN) of a healthcare facility, comprising: during a roaming mode of a wireless patient monitoring device connected to the WLAN via a first access point (AP) of the WLAN, receiving AP information at the wireless patient monitoring device transmitted from one or more neighboring wireless devices connected to the WLAN using out-of-band (OOB) radio communication, and connecting the wireless patient monitoring device to a second AP of the WLAN, the second AP different from the first AP, based on the received AP information. In a first example of the method, receiving the AP information from the one or more neighboring wireless devices connected to the WLAN further comprises receiving the AP information in response to detecting an irregularity in a connection between the wireless patient monitoring device and the first AP, the irregularity including a decrease in a signal strength below a threshold signal strength. In a second example of the method, optionally including the first example, the OOB radio communication includes short range, low power radio communication over an OOB communication channel. In a third example of the method, optionally including one or both of the first and second examples, the OOB communication channel is a radio frequency channel associated with a medical body area network (MBAN). In a fourth example of the method, optionally including one or more or each of the first through third examples, receiving the AP information from the one or more neighboring wireless devices connected to the WLAN further comprises sending a request from the wireless patient monitoring device to the one or more neighboring wireless devices connected to the WLAN via the OOB communication channel, and receiving the AP information via the OOB communication channel in response to the request. In a fifth example of the method, optionally including one or more or each of the first through fourth examples, the received AP information includes information of an AP that a neighboring wireless device of the one or more neighboring wireless devices connected to the WLAN is connected to. In a sixth example of the method, optionally including one or more or each of the first through fifth examples, the information of the AP that the neighboring wireless device is connected to includes a Received Signal Strength Indicator (RSSI) of the AP at the neighboring wireless device. In a seventh example of the method, optionally including one or more or each of the first through sixth examples, connecting the wireless patient monitoring device to the second AP based on the received AP information further comprises scanning the WLAN for one or more candidate APs based on the received AP information. In an eighth example of the method, optionally including one or more or each of the first through seventh examples, scanning the WLAN for the one or more candidate APs based on the received AP information further comprises: performing a prioritized scan, where selected channels of the WLAN are scanned based on the received AP information, and not performing a full scan, where a total number of channels of the WLAN is scanned for the one or more candidate APs. In a ninth example of the method, optionally including one or more or each of the first through eighth examples, the method further comprises: reordering the selected channels at the wireless patient monitoring device in accordance with a prioritized AP list based on the received AP information, such that an AP with a highest priority is listed first in the prioritized AP list, and a channel associated with the AP with the highest priority is scanned first when performing a prioritized scan of the selected channels. In a tenth example of the method, optionally including one or more or each of the first through ninth examples, the selected channels include channels where an AP of the prioritized AP list has an RSSI above a threshold signal strength.

The disclosure also provides support for a method for a wireless local area network (WLAN) of a healthcare facility, comprising: receiving, at a first wireless patient monitoring device connected to the WLAN, an OOB beacon including access point (AP) information of the second wireless patient monitoring device connected to the WLAN. In a first example of the method, the transmitted AP information includes information of an AP to which the second wireless patient monitoring device is connected to. In a second example of the method, optionally including the first example, the transmitted AP information includes a Received Signal Strength Indicator (RSSI) of an in-band signal of the AP to which the second wireless patient monitoring device is connected to. In a third example of the method, optionally including one or both of the first and second examples, the OOB communication channel is a radio frequency channel of a medical body area network (MBAN) within the 2360-2500 MHz band of frequencies.

The disclosure also provides support for a system, comprising: a wireless patient monitoring device connected to a wireless local area network (WLAN) of a hospital via an access point (AP), the wireless patient monitoring device including one or more processors having executable instructions stored in a non-transitory memory that, when executed, cause the one or more processors to: during a roaming process of the wireless patient monitoring device, in response to a Received Signal Strength Indicator (RSSI) of the AP decreasing below a threshold RSSI: receive, from one or more neighboring wireless devices connected to the WLAN, AP information regarding other APs connected to by the one or more neighboring wireless devices via an out-of-band (OOB) communication channel, select an alternative AP to connect to based on the AP information, and connect to the alternative AP via an in-band communication channel. In a first example of the system, the AP information includes, for each AP of the other APs connected to by the one or more neighboring wireless devices, at least an RSSI of the AP. In a second example of the system, optionally including the first example, selecting the alternative AP to connect to based on the AP information further comprises: compiling a prioritized list of each AP of the other APs accessible to the one or more neighboring wireless devices according to a priority of each AP, shortening the prioritized list by eliminating APs with an RSSI below a threshold RSSI, scanning channels associated with APs on the shortened, reordered prioritized list, and selecting an alternative AP of the prioritized list. In a third example of the system, optionally including one or both of the first and second examples, the priority of each AP is established based on at least on an RSSI of the AP, a signal-to-noise ratio (SNR) of the AP, a number of data retries in a given time period, a number of expected beacons received or not received in a given time period, a current data rate, and a time since a last scan. In a fourth example of the system, optionally including one or more or each of the first through third examples, the OOB communication channel is a channel of a medical body area network (MBAN).

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A method for a wireless local area network (WLAN) of a healthcare facility, comprising:
receiving, at a first wireless patient monitoring device connected to the WLAN, a beacon on an OOB communication channel including access point (AP) information of a second wireless patient monitoring device connected to the WLAN, wherein the transmitted AP information includes a Received Signal Strength Indicator (RSSI) of an in-band signal of the AP to which the second wireless patient monitoring device is connected; and
performing prioritized scanning of the WLAN for one or more candidate APs based on an order determined by the RSSI.

2. The method of claim 1, wherein:
the transmitted AP information includes information of an AP to which the second wireless patient monitoring device is connected.

3. The method of claim 1, wherein the OOB communication channel is a radio frequency channel of a medical body area network (MBAN) within the 2360-2500 MHz band of frequencies.

4. A system, comprising:
a wireless patient monitoring device configured to be connected to a wireless local area network (WLAN) of a hospital via an access point (AP), the wireless patient monitoring device including one or more processors having executable instructions stored in a non-transitory memory that, when executed, cause the one or more processors to:
during a roaming process of the wireless patient monitoring device, in response to a Received Signal Strength Indicator (RSSI) of the AP decreasing below a threshold RSSI:
receive, from one or more neighboring wireless devices connected to the WLAN via an out-of-band (OOB) communication channel, AP information regarding other APs connected to by the one or more neighboring wireless devices;
select an alternative AP to connect to based on the AP information, wherein the selecting the alternative AP to connect to based on the AP information comprises compiling a prioritized list of each AP of the other APs accessible to the one or more neighboring wireless devices according to a priority of each AP, wherein the priority of each AP is established based on at least one of an RSSI of the AP, a signal-to-noise ratio (SNR) of the AP, a number of data retries in a given time period, a number of expected beacons received or not received in a given time period, a current data rate, and a time since a last scan; and
connect to the alternative AP via an in-band communication channel.

5. The system of claim 4, wherein the AP information includes, for each AP of the other APs connected to by the one or more neighboring wireless devices, at least an RSSI of the AP.

6. The system of claim 4, wherein the selecting the alternative AP to connect to based on the AP information further comprises:
shortening the prioritized list by eliminating APs with an RSSI below a threshold RSSI;
scanning channels associated with APs on the shortened, reordered prioritized list; and
selecting the alternative AP from the prioritized list.

7. The system of claim 4, wherein the OOB communication channel is a channel of a medical body area network (MBAN).

* * * * *